United States Patent
Hagihara (10) Patent No.: US 10,851,887 B2
(45) Date of Patent: Dec. 1, 2020

(54) PULLEY PROPULSION DEVICE OF AUTOMATIC TRANSMISSION AND CONTROL DEVICE FOR AUTOMATIC TRANSMISSION

(71) Applicants: JATCO Ltd, Fuji (JP); NISSAN MOTOR CO., LTD., Yokohama (JP)

(72) Inventor: Takanori Hagihara, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/329,213

(22) PCT Filed: Oct. 2, 2017

(86) PCT No.: PCT/JP2017/035880
§ 371 (c)(1),
(2) Date: Feb. 28, 2019

(87) PCT Pub. No.: WO2018/070292
PCT Pub. Date: Apr. 19, 2018

(65) Prior Publication Data
US 2019/0242473 A1    Aug. 8, 2019

(30) Foreign Application Priority Data
Oct. 11, 2016    (JP) .................................. 2016-200367

(51) Int. Cl.
*F16H 59/04*    (2006.01)
*F16H 9/14*    (2006.01)
(Continued)

(52) U.S. Cl.
CPC ............. *F16H 59/044* (2013.01); *F16H 9/14* (2013.01); *F16H 9/18* (2013.01); *F16H 55/56* (2013.01);
(Continued)

(58) Field of Classification Search
CPC .. F16H 61/66272; F16H 63/062; F16H 55/56; F16H 63/067; F16H 63/065
(Continued)

(56) References Cited

U.S. PATENT DOCUMENTS

| 2 A | * | 7/1836 | Goulding ................. D06C 3/00 57/58.49 |
| 4,088,036 A | * | 5/1978 | Hillman ............ F16H 61/66245 324/175 |

(Continued)

FOREIGN PATENT DOCUMENTS

| JP | H05-6245 A | 1/1993 |
| JP | H05-6245 U | 1/1993 |

(Continued)

OTHER PUBLICATIONS

PCT International Search Report (with English Translation) and Written Opinion (Japanese Language only) in corresponding International Application No. PCT/JP2017/035880 dated Nov. 14, 2017.

*Primary Examiner* — Henry Y Liu
(74) *Attorney, Agent, or Firm* — Foley & Lardner LLP (57) ABSTRACT

A pulley propulsion device for an automatic transmission, which includes a fixed pulley, and a movable pulley constituted capable of relative displacement along a rotation axis of a pulley with respect to the fixed pulley, is provided. The pulley propulsion device includes a movable member constituted capable of relative rotation around a rotation axis of the pulley with respect to the movable pulley, a fixed member whose rotation with respect to a pulley case is regulated and adapted to give linear displacement to the movable member along the rotation axis of the pulley on the basis of rotation thereof, a driving mechanism having an electric motor and adapted to cause an output torque of the electric motor to be transmitted to the movable member and
(Continued)

to cause the movable pulley to generate a predetermined pulley thrust, and a load sensor adapted to detect a load applied on the fixed member.

8 Claims, 9 Drawing Sheets

(51) Int. Cl.
<table>
<tr><td>F16H 55/56</td><td>(2006.01)</td></tr>
<tr><td>F16H 61/662</td><td>(2006.01)</td></tr>
<tr><td>F16H 61/02</td><td>(2006.01)</td></tr>
<tr><td>F16H 9/18</td><td>(2006.01)</td></tr>
<tr><td>F16H 59/68</td><td>(2006.01)</td></tr>
</table>

(52) U.S. Cl.
CPC .......... *F16H 61/02* (2013.01); *F16H 61/662* (2013.01); *F16H 61/66259* (2013.01); *F16H 2059/6892* (2013.01)

(58) Field of Classification Search
USPC .............................................. 474/8
See application file for complete search history.

(56) References Cited

U.S. PATENT DOCUMENTS

| | | | | |
|---|---|---|---|---|
| 4,174,641 | A * | 11/1979 | Hillman | F16H 61/66259 324/175 |
| 4,735,598 | A * | 4/1988 | Moroto | F16H 63/067 474/29 |
| 4,973,288 | A * | 11/1990 | Sakakibara | F16H 37/0846 474/12 |
| 5,094,652 | A * | 3/1992 | Sakakibara | F16H 37/022 474/46 |
| 5,378,198 | A * | 1/1995 | Moroto | F16H 63/062 474/30 |
| 6,120,400 | A * | 9/2000 | Onogi | F16H 63/062 474/30 |
| 6,383,102 | B1 * | 5/2002 | Onogi | F16H 9/125 474/18 |
| 6,622,072 | B2 * | 9/2003 | Asumi | F16H 9/12 474/100 |
| 6,626,778 | B1 * | 9/2003 | Kapaan | F16H 55/56 474/20 |
| 6,689,000 | B1 * | 2/2004 | Kapaan | F16H 55/56 474/20 |
| 6,764,421 | B2 * | 7/2004 | Onogi | F16H 55/56 474/46 |
| 6,997,832 | B2 * | 2/2006 | Onogi | F16H 55/56 474/46 |
| 8,221,286 | B2 * | 7/2012 | Van Der Noll | F16H 61/66272 474/62 |
| 8,534,413 | B2 * | 9/2013 | Nelson | B60W 50/082 180/366 |
| 8,600,634 | B2 * | 12/2013 | Van Der Sluid | F16H 61/66272 474/11 |
| 2002/0169041 | A1 * | 11/2002 | Onogi | F16H 55/56 474/46 |
| 2004/0209719 | A1 * | 10/2004 | Ochiai | B60W 10/06 474/18 |
| 2015/0267792 | A1 * | 9/2015 | Hochmayr | F16H 63/065 474/14 |
| 2015/0323065 | A1 * | 11/2015 | Pattakos | F16H 55/563 474/12 |
| 2015/0369363 | A1 * | 12/2015 | Kanehara | F16H 61/0021 474/28 |
| 2016/0186841 | A1 * | 6/2016 | Ebihara | F16H 9/18 474/8 |
| 2016/0290503 | A1 * | 10/2016 | Kawamoto | F16H 61/66272 |
| 2018/0058573 | A1 * | 3/2018 | Barath | F16H 59/44 |
| 2018/0252315 | A1 * | 9/2018 | Rippelmeyer | F16H 61/66272 |

FOREIGN PATENT DOCUMENTS

| | | |
|---|---|---|
| JP | H07-119805 A | 5/1995 |
| JP | 2002-537529 A | 11/2002 |
| JP | 2013-540245 A | 10/2013 |

* cited by examiner

PULLEY PROPULSION DEVICE OF AUTOMATIC TRANSMISSION AND CONTROL DEVICE FOR AUTOMATIC TRANSMISSION

CROSS-REFERENCE TO RELATED APPLICATIONS

This application is a National Phase of International Patent Application No. PCT/JP2017/035880 filed on Oct. 2, 2017, which claims priority to Japanese Patent Application No. 2016-200367 filed on Oct. 11, 2016. The contents of these applications are herein incorporated by reference in their entirety.

TECHNICAL FIELD

The present invention relates to a pulley propulsion device for an automatic transmission including an electric motor for shifting and a control device for the automatic transmission including the same.

BACKGROUND ART

As an automatic transmission including an electric motor for shifting, JP2013-540245 discloses the one driving a movable disk of a pulley by transmitting an output torque of an adjusting device to a threaded spindle by a gear. The threaded spindle is supported by a threaded-spindle thrust bearing in an axial direction, and a reaction force from the movable disk is input into an axial force sensor provided on a rear surface of this thrust bearing. The axial force applied on the movable disk is evaluated on the basis of an output from the axial force sensor.

SUMMARY OF INVENTION

However, in JP2013-540245, since the axial force sensor is disposed on the rear surface of the threaded-spindle thrust bearing, a roller moves in a circumferential direction with rotation of the thrust bearing, whereby an input into the axial force sensor is changed, and the axial force cannot be evaluated accurately, which is a problem.

Specifically, when the axial force sensor is located on the exact rear of the roller, the axial force to the thrust bearing is transmitted to the axial force sensor through the roller, and a detected load becomes larger, while if the axial force sensor is not located on the exact rear of the roller, the axial force is transmitted to the axial force sensor through a case of a roller or a lace member and thus, the detected load becomes relatively smaller. Here, if the detected load over time is averaged in order to ensure detection accuracy of the load, the detection load cannot be obtained for a period of time required for calculation of an average value, and it is concerned that responsiveness becomes insufficient. Moreover, if the thrust bearing is stopped or if it is rotated but at an extremely low speed, a position of the roller cannot be determined and thus, accurate evaluation of the axial force becomes difficult.

In view of the aforementioned problems, the present invention has an object to enable detection of a pulley thrust without being influenced by disturbance from the thrust bearing or the like in the automatic transmission.

In one aspect of the present invention, a pulley propulsion device for an automatic transmission is provided. The pulley propulsion device of this aspect is provided in the automatic transmission including a fixed pulley, and a movable pulley constituted capable of relative displacement along a rotation axis of a pulley with respect to the fixed pulley, and includes a movable member constituted capable of relative rotation around a rotation axis of the pulley with respect to the movable pulley, a fixed member whose rotation with respect to a pulley case is regulated and adapted to give linear displacement to the movable member along the rotation axis of the pulley on the basis of rotation thereof, a driving mechanism having an electric motor and adapted to cause an output torque of the electric motor to be transmitted to the movable member and to cause the movable pulley to generate a predetermined pulley thrust, and a load sensor adapted to detect a load applied on the fixed member.

In another aspect of the present invention, a control device for an automatic transmission is provided, which includes the pulley propulsion device, and a control unit adapted to control the electric motor on the basis of a detection signal of the load sensor.

According to the aforementioned aspect, since a load applied on the fixed member whose rotation with respect to the pulley case is regulated is made detectable by the load sensor, the pulley thrust can be detected without being influenced by a rotation element such as the thrust bearing.

DESCRIPTION OF EMBODIMENTS

Embodiments of the present invention will be described below by referring to the drawings.

(Constitution of Vehicle Driving System)

Figure 1:
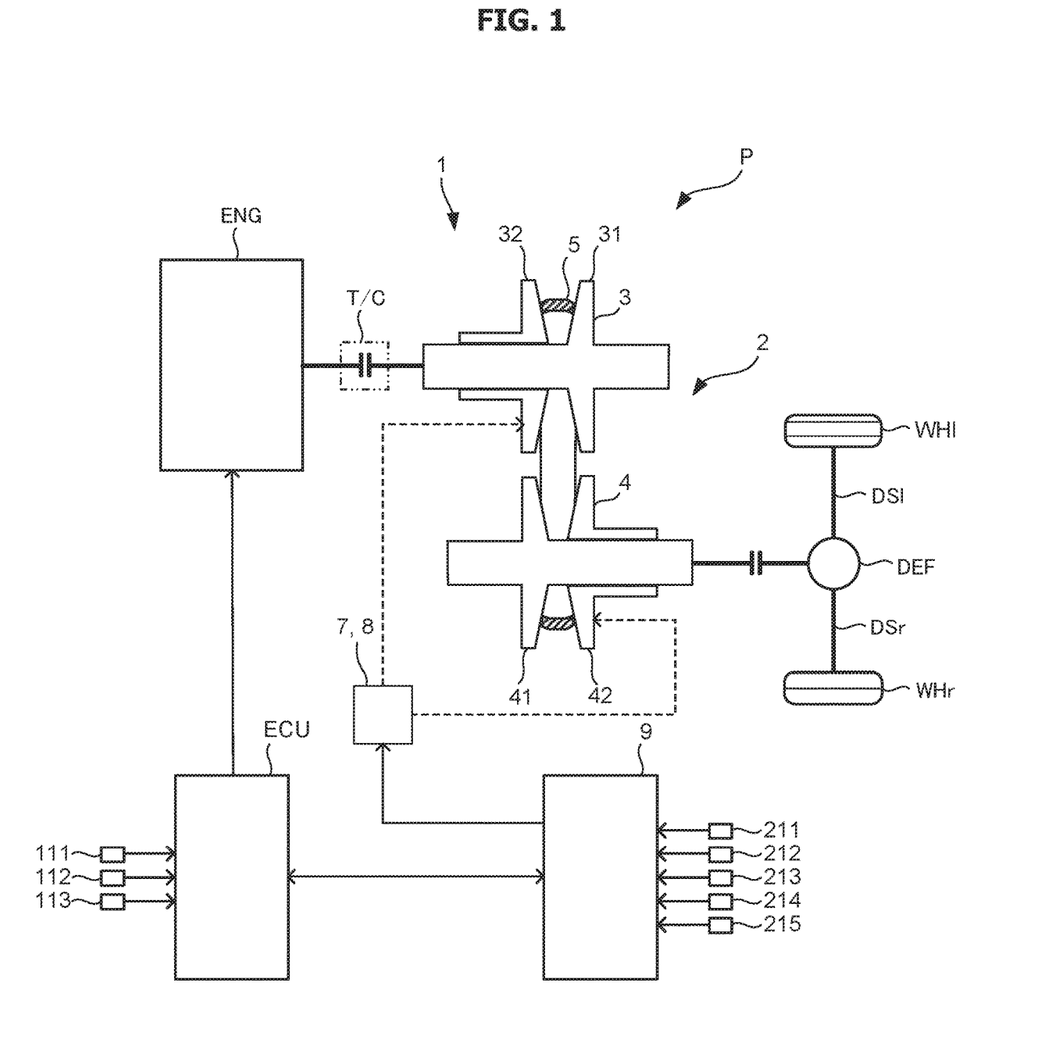
FIG. 1 is a schematic diagram illustrating an entire constitution of a vehicle driving system including an automatic transmission according to an embodiment of the present invention.

FIG. 1 schematically illustrates an entire constitution of a power transmission system (hereinafter, referred to as a "driving system") P of a vehicle on which an automatic transmission 1 according to a first embodiment of the present invention is mounted.

The driving system P according to this embodiment includes an internal combustion engine (hereinafter referred to simply as an "engine") ENG as a driving source and includes the automatic transmission 1 on a power transmission path connecting the engine ENG and left and right driving wheels WHl and WHr. The engine ENG and the automatic transmission 1 are connected through a torque converter T/C including a lockup clutch. The automatic transmission 1 converts a rotation power input from the engine ENG by a predetermined speed ratio and outputs it to the driving wheels WHl and WHr through a differential gear DEF.

The rotation power output from the automatic transmission 1 is transmitted to driving shafts DSl and DSr through a final gear train set to a predetermined speed reduction ratio or a sub-transmission (none of them is shown) and the differential gear DEF and rotates the driving wheels WHl and WHr.

(Constitution and Basic Operation of Control System)

Operations of the engine ENG and the automatic transmission 1 are controlled by an engine controller ECU and a transmission controller 9, respectively. The engine controller ECU and the transmission controller 9 are both configured as electronic control units, and are constituted by microcomputers including various storage devices such as a central processing unit (CPU), a RAM and ROM, an input/output interface and the like.

The engine controller ECU inputs a detection signal of an operation state sensor adapted to detect an operation state of the engine 1, executes predetermined calculation on the basis of the operation state and sets a fuel injection amount, fuel injection timing, ignition timing and the like of the engine ENG. As the operation state sensor, an accelerator pedal sensor 111 adapted to detect an operation amount of an accelerator pedal by a driver, a rotation speed sensor 112 adapted to detect a rotation speed of the engine ENG, a cooling water temperature sensor 113 adapted to detect a temperature of an engine cooling water and the like are provided and in addition, an airflow meter, a throttle sensor, a fuel pressure sensor, an air/fuel ratio sensor and the like, not shown, are provided.

The transmission controller 9 is connected to the engine controller ECU through a CAN-standard bus or the like, capable of communication with each other. Moreover, in relation with control of the automatic transmission 1, a vehicle speed sensor 211 adapted to detect a running speed of a vehicle, an input-side rotation speed sensor 212 adapted to detect a rotation speed of an input shaft of the automatic transmission 1, an output-side rotation speed sensor 213 adapted to detect a rotation speed of an output shaft of the automatic transmission 1, an operation oil temperature sensor 214 adapted to detect a temperature of an operation oil of the automatic transmission 1, a shift position sensor 215 adapted to detect a position of a shift lever and the like are provided, and the transmission controller 9 inputs an accelerator pedal opening and the like as the operation state of the engine ENG from the engine controller ECU and inputs detection signals of these sensors.

Then, the transmission controller 9 determines a shift range selected by the driver on the basis of the signal from the shift position sensor 215, sets a target speed ratio of the automatic transmission 1 on the basis of the accelerator opening and a vehicle speed and the like, and causes a predetermined pulley thrust according to the target speed ratio to act on movable pulleys 32 and 42 of a primary pulley 3 and a secondary pulley 4 by controlling electric motors 7 and 8 of the pulley propulsion device which will be described later.

(Entire Constitution of Automatic Transmission)

Figure 2:
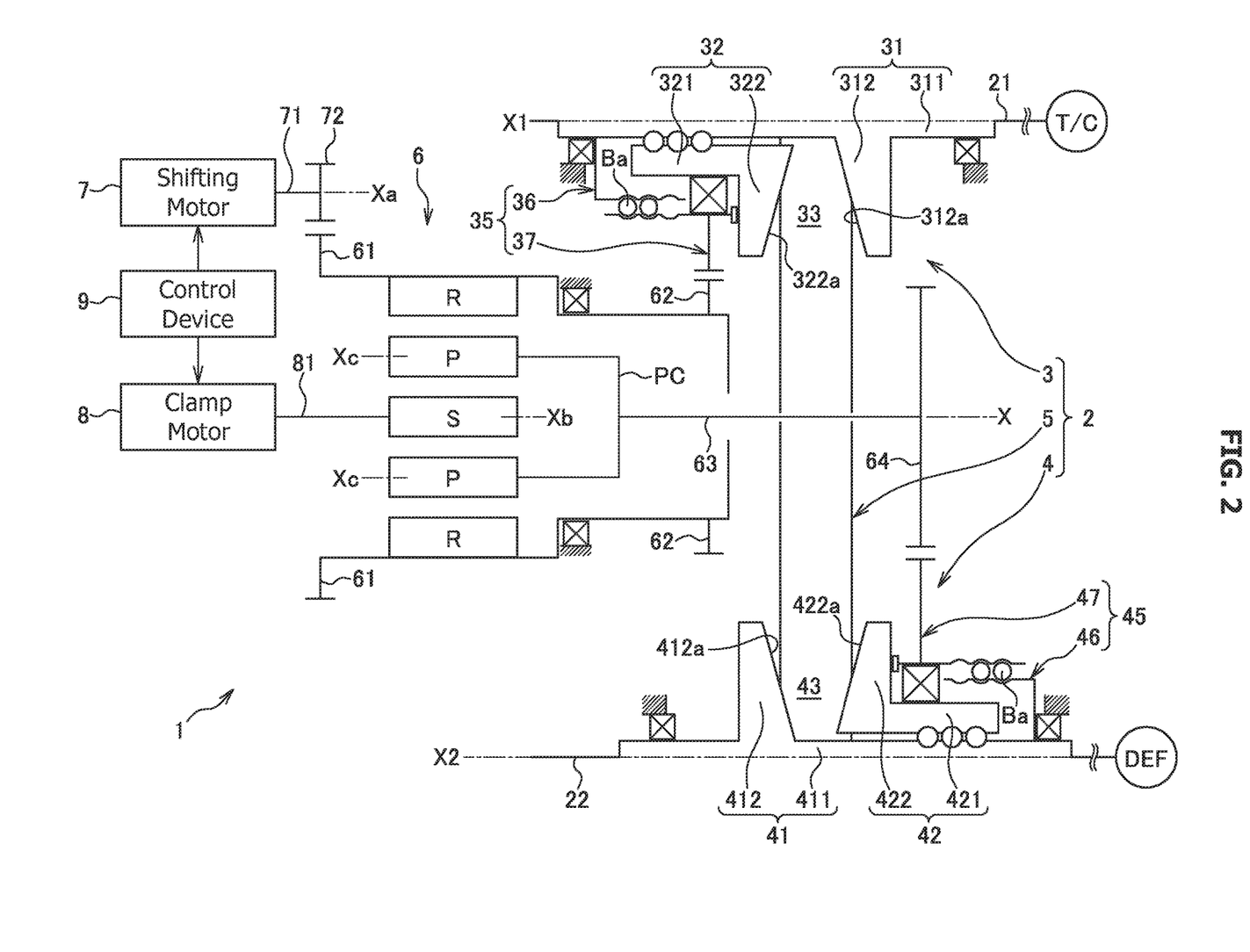
FIG. 2 is a schematic diagram illustrating the entire constitution of the automatic transmission of the same.

FIG. 2 schematically illustrates an entire constitution of the automatic transmission 1 according to this embodiment.

FIG. 2 illustrates only one side based on rotation axes X1 and X2 of the pulleys in the primary pulley 3 and the secondary pulley 4.

In this embodiment, the automatic transmission 1 is a continuously variable automatic transmission and constitutes a transmission apparatus for a vehicle.

The automatic transmission 1 includes a variator 2 constituted by the primary pulley 3, the secondary pulley 4, and a belt 5 wound around these pulleys 3 and 4. The belt 5 may be a steel belt bundling a plurality of elements aligned in a plate thickness direction by a hoop or a band and this is not limiting and may be a chain belt. The automatic transmission 1 is capable of continuously adjusting a speed ratio by changing a winding radius of the belt 5 in the primary pulley 3 and the secondary pulley 4. Here, the speed ratio refers to a ratio between a rotation speed Ni of a variator input shaft 21 and a rotation speed No of a variator output shaft 22 (=No/Ni), and in this embodiment, a rotation speed ratio between the primary pulley 3 and the secondary pulley 4 corresponding to that. The automatic transmission 1 outputs a torque input from the driving source, not shown (the engine ENG in this embodiment), through the torque converter T/C to the output shaft 22 connected to the differential gear DEF after shifting by the predetermined speed ratio.

The primary pulley 3 is constituted by a fixed pulley 31 and the movable pulley 32 provided capable of displacement in a direction of the rotation axis X1 of the primary pulley 3 with respect to the fixed pulley 31, and the movable pulley 32 is mounted in a state where relative rotation around the rotation axis X1 is regulated with respect to the fixed pulley 31. The fixed pulley 31 and the movable pulley 32 have a sheave surfaces 312$a$ and 322$a$ faced with each other, and these sheave surfaces 312$a$ and 322$a$ form a V-groove 33 around which the belt 5 is wound on the primary pulley 3.

The secondary pulley 4 is also constituted by a fixed pulley 41 and a movable pulley 42 similarly to the primary pulley 3, and the movable pulley 42 is capable of displacement in a direction of the rotation axis X2 of the secondary pulley 4 with respect to the fixed pulley 41 and is mounted in a state where relative rotation around the rotation axis X2 is regulated. A V-groove 43 around which the belt 5 is wound on the secondary pulley 4 is formed by sheave surfaces 412$a$ and 422$a$ faced with each other of the fixed pulley 41 and the movable pulley 42.

In this embodiment, in each of the primary pulley 3 and the secondary pulley 4, the rotation axes X1 and X2 of the pulleys are formed by the rotation shafts of the fixed pulleys 31 and 41.

Feed screw mechanisms 35 and 45 are provided in the primary pulley 3 and the secondary pulley 4, respectively, and it is constituted such that an output torque of an electric motor provided for shifting (hereinafter referred to as a "shifting motor") 7 is transmitted to the movable pulleys 32 and 42 through the feed screw mechanisms 35 and 45, and the pulley thrust pressing the movable pulleys 32 and 42 to the direction narrowing groove widths of the V-grooves 33 and 43 is generated. Moreover, it is constituted such that the output torque of the electric motor provided for belt clamping (hereinafter referred to as a "clamp motor") is transmitted to the movable pulleys 32 and 42 through the feed screw mechanisms 35 and 45, and a belt clamp force sandwiching the belt 5 by the movable pulleys 32 and 42 and the fixed pulleys 31 and 41 is generated.

In this embodiment, an electric motor having a large maximum rotation number is employed for the shifting motor 7, and an electric motor having a large maximum output torque is employed for the clamp motor 8. Operations of the shifting motor 7 and the clamp motor 8 are controlled by the control device 9. The control device 9 is configured as an electronic control unit and incorporates a microcomputer, storage devices such as a ROM and a RAM, and an input/output interface.

(Constitution of Feed Screw Mechanism)

Figure 3:
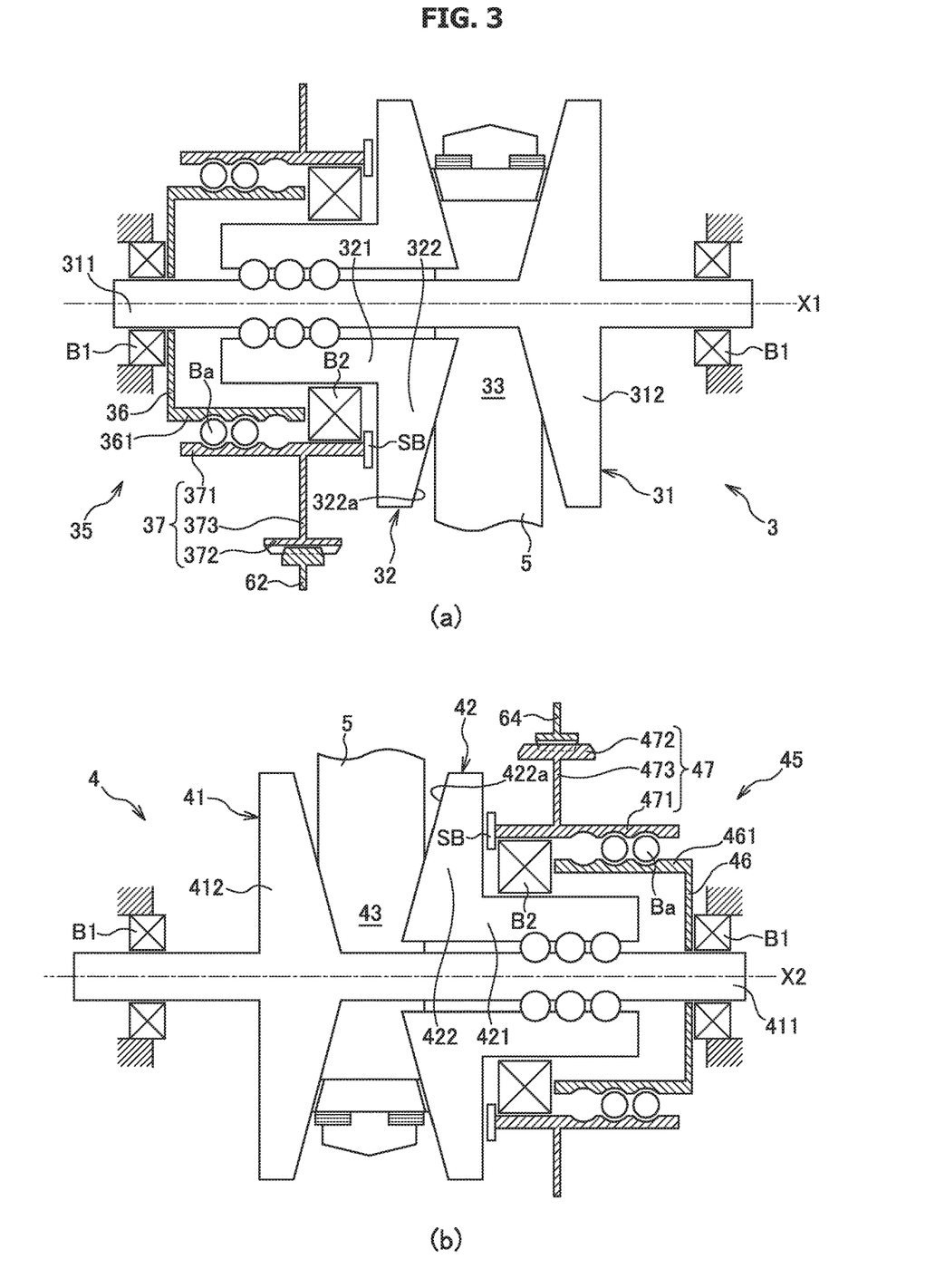
FIG. 3 is a configuration diagram of a feed screw mechanism provided in the automatic transmission of the same.

FIG. 3 illustrate constitutions of the feed screw mechanisms 35 and 45 provided in the automatic transmission 1. FIG. 3(a) illustrates the feed screw mechanism 35 on the primary pulley 3 side, and FIG. 3(b) illustrates the feed screw mechanism 45 on the secondary pulley 4 side.

Describing the feed screw mechanism 35 on the primary pulley 3 side by being represented, the feed screw mechanism 35 has a fixed member 36 externally fitted with a rotation shaft 311 of the fixed pulley 31 and a movable member 37 externally inserted into the fixed member 36 (specifically, a cylindrical portion 361 of the fixed member 36).

The movable member 37 is supported by a radial bearing B2 with respect to a rotation shaft 321 of the movable pulley 32 and in a state in contact with a sheave portion 322 of the movable pulley 32 through a thrust bearing SB.

The fixed member 36 has axial movement regulated by a radial bearing B1 rotatably supporting the rotation shaft 311 of the fixed pulley 31 with respect to a pulley case and is in a state where relative rotation with respect to the pulley case is regulated by a rotation regulating member. In this embodiment, the fixed member 36 constitutes a shaft portion of a ball screw feeding mechanism and holds a plurality of balls Ba between itself and the movable member 37 (specifically, a pressing portion 371 of the movable member 37). Since the rotation of the fixed member 36 with respect to the pulley case is in the regulated state, the fixed member 36 gives linear displacement along the rotation axis X1 of the primary pulley 3 to the movable member 37 when the movable member 37 is rotated/driven.

The movable member 37 has the cylindrical pressing portion 371 in contact with the sheave portion 322 of the movable pulley 32, an outer cylinder portion 372 having an outer diameter larger than the pressing portion 371, and a disk-shaped connection portion 373 connecting the pressing portion 371 and the outer cylinder portion 372, and a plurality of gear teeth is formed on an outer periphery of the outer cylinder portion 372. When output torques of the electric motors 7 and 8 are input through the gear teeth of the outer cylinder portion 372, the linear displacement based on the rotation is given to the movable member 37 by the ball screw feed mechanism, and the movable member 37 is pressed onto the sheave portion 322 of the movable pulley 32 through the thrust bearing SB.

Here, when the speed ratio of the variator 2 is changed, if the movable member 37 is displaced in a direction pressing the movable pulley 32 (in other words, a direction narrowing the groove width of the V-groove 33) by the torque input through the outer periphery portion 372 in the feed screw mechanism 35 on the primary pulley 3 side, the movable member 47 is displaced in a direction allowing separation from the fixed pulley 41 of the movable pulley 42 (in other words, a direction widening the groove width of the V-groove 43) by the torque input through an outer periphery portion 472 in the feed screw mechanism 45 on the secondary pulley 4 side.

On the contrary, when the speed ratio of the variator 2 is changed, if the movable member 37 is displaced in the direction allowing the separation from the fixed pulley 31 of the movable pulley 32 (in other words, the direction widening the groove width of the V-groove 33) by the torque input through the outer periphery portion 372 in the feed screw mechanism 35 on the primary pulley 3 side, the movable member 47 is displaced in the direction pressing the movable pulley 42 (in other words, the direction narrowing the groove width of the V-groove 43) by the torque input through the outer periphery portion 472 in the feed screw mechanism 45 on the secondary pulley 4 side.

Returning to FIG. 2, in this embodiment, a planetary gear mechanism 6 is interposed between the shifting motor 7 as well as the clamp motor 8 and the feed screw mechanisms 35 and 45.

The planetary gear mechanism 6 transmits an output torque of at least either one of the shifting motor 7 and the clamp motor 8 to the movable pulleys 32 and 42 through the feed screw mechanisms 35 and 45 and is constituted by a sun gear S, a ring gear R, a plurality of pinion gears P, and pinion carriers PC supporting the pinion gears P. A motor pinion 72 fixed to an output shaft 71 of the shifting motor 7 is engaged with an outer teeth portion 61 formed on an outer periphery of the ring gear R, and the output torque of the shifting motor 7 is transmitted to the ring gear R through the motor pinion 72 and the outer teeth portion 61.

On an inner side in a radial direction of the ring gear R, the sun gear S directly connected to an output shaft 81 of the clump motor 8 is disposed concentrically with the ring gear R, and the sun gear S and the ring gear R are in a state capable of relative rotation with respect to each other around an axis Xb in common to the both. And the plurality of pinion gears P is provided in a state separated at intervals from each other (in a state with equal intervals from each other in this embodiment) in a circumferential direction around a rotation axis X of the planetary gear mechanism 6, the sun gear S and the ring gear R are engaged with each other through the pinion gear P, and the output torque of the shifting motor 7 is transmitted to the pinion gear P through the ring gear R, while the output torque of the clamp motor 8 to the ring gear R through the sun gear S and the pinion gear P, respectively.

Each of the pinion gears P is supported by a pinion carrier PC provided rotatably around a rotation axis X in a state rotatable around a rotating axis Xc in parallel with the rotation axis X. The pinion carrier PC is joined with a rotation transmission shaft 63 extending along the rotation axis X, and an output gear portion 64 on the secondary pulley 4 side is joined to a distal end of the rotation transmission shaft 63. The output gear portion 64 is engaged with a gear portion (the outer cylinder portion 472) provided on the movable member 47 of the feed screw mechanism 45 on the secondary pulley 4 side, and when the pinion carrier PC is rotated, the output torque of the planetary gear mechanism 6 is input into the feed screw mechanism 45 through the rotation transmission shaft 63 and the output gear portion 64.

The ring gear R has an annular output gear portion 62 formed on the cylindrical portion extending in parallel with the rotation transmission shaft 63 along the rotation axis X, and this output gear portion 62 on the primary pulley 3 side is engaged with a gear portion (outer cylinder portion 372) provided on the movable member 37 of the feed screw mechanism 35 on the primary pulley 3 side, and when the ring gear R is rotated, an output torque of the planetary gear mechanism 6 is input into the feed screw mechanism 35 through the output gear portion 62.

The planetary gear mechanism 6 adjusts a torque for changing a speed ratio of the variator 2 or for fixing the speed ratio from the output torque of the shifting motor 7 and the output torque of the clamp motor 8.

Specifically, when the speed ratio of the variator 2 is to be changed, the output torque of the shifting motor 7 is input into the feed screw mechanisms 35 and 45 through the planetary gear mechanism 6 and is converted to a force (pulley thrust) driving the movable members 37 and 47 along the rotation axes X1 and X2. For example, when the movable pulley 32 is pressed by the movable member 37 of the feed screw mechanism 35, the groove width of the V-groove 33 is reduced on the primary pulley 3 side, while displacement of the movable pulley 42 to a direction separated away from the fixed pulley 41 by the movable member 47 of the feed screw mechanism 45 is allowed and thus, the groove width of the V-groove 43 on the secondary pulley 4 side is enlarged.

On the other hand, when the speed ratio is to be kept, the output torque of the clamp motor 8 is input into the feed screw mechanisms 35 and 45 through the planetary gear mechanism 6 and is converted to a force for holding the movable members 37 and 47 at certain positions relating to the directions of the rotation axes X1 and X2. Since rotation of the movable members 37 and 47 is regulated, the displacement of the movable pulleys 32 and 42 along the rotation axes X1 and X2 is regulated, and a clamp force (a belt clamp force) with respect to the belt 5 is maintained.

(Operation at Shifting)

Figure 4:
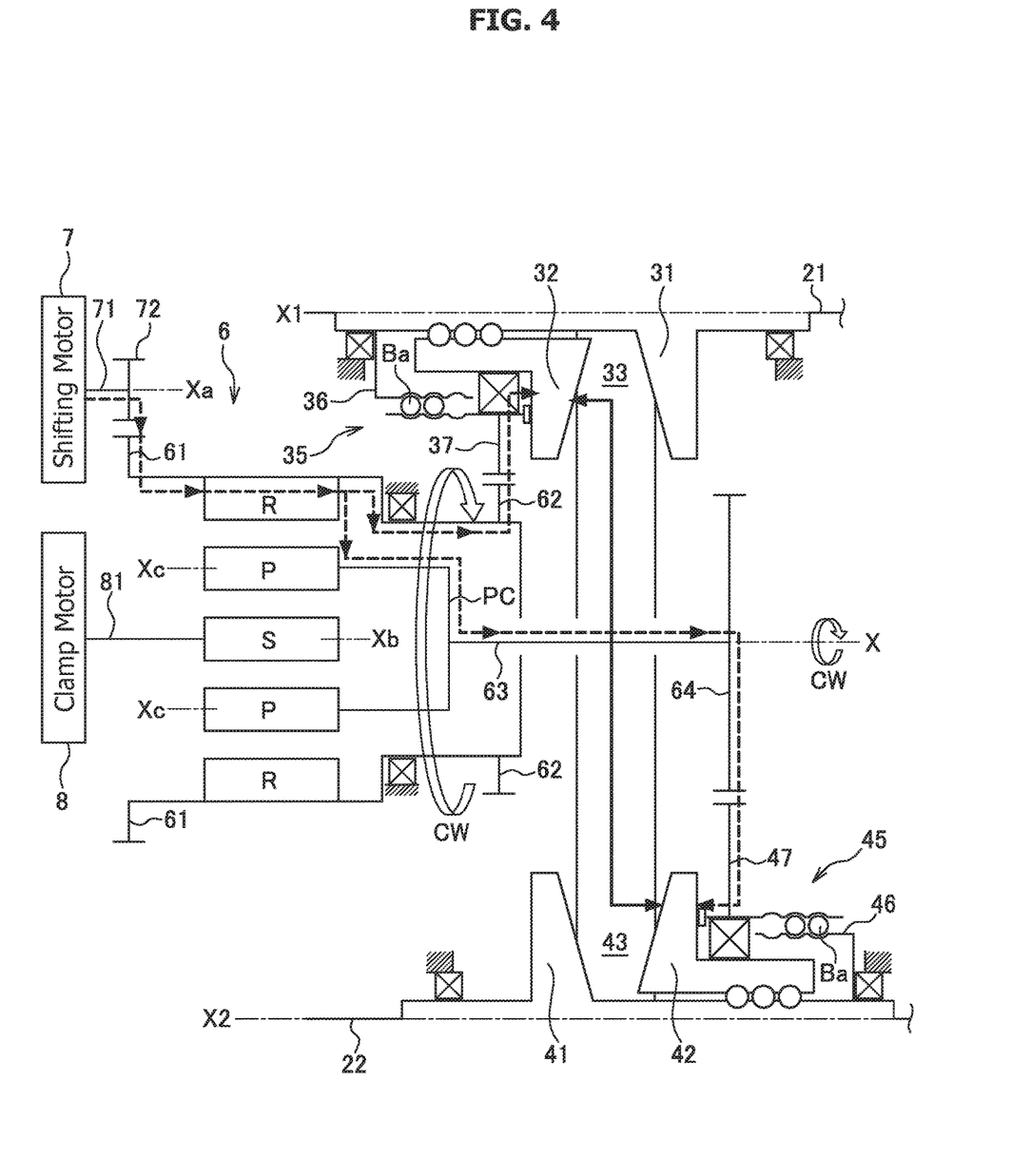
FIG. 4 is an explanatory view illustrating an operation at shifting of the automatic transmission of the same.

FIG. 4 illustrates an operation at shifting of the automatic transmission 1 according to this embodiment.

At the shifting, the clamp motor 8 is driven so as to generate a holding torque, and a pulley thrust for changing the speed ratio by the shifting motor 7 is generated. By changing the output torque of the shifting motor 7 and by generating a difference in the pulley thrust (hereinafter referred to as a "thrust difference") acting on the primary pulley 3 and the secondary pulley 4, by a desired speed ratio is achieved.

The output torque of the shifting motor 7 is input into the ring gear R through the motor pinion 72 and the outer teeth portion 61 of the ring gear R, and the ring gear R is rotated around the rotation axis X of the planetary gear mechanism 6. When the ring gear R is rotated, the pinion gear P is rotated around the rotating axis Xc thereof. Here, since the clamp motor 8 generates the holding torque and the rotation of the sun gear S is suppressed, when the pinion gear P is rotated around the rotating axis Xc, the pinion carrier PC supporting this is rotated in the same direction CW as that of the ring gear R around the rotation axis X. As a result, the output gear portion 62 joined to the ring gear R and the output gear portion 64 coupled with the pinion carrier PC through the rotation transmission shaft 63 are both rotated in the same direction CW around the rotation axis X, and the output torque of the shifting motor 7 is input into the movable members 37 and 47 of the feed screw mechanisms 35 and 45.

The rotation of the output gear portions 62 and 64 is converted to linear displacement of the movable members 37 and 47 by the feed screw mechanisms 35 and 45, and the movable members 37 and 47 are moved along the rotation axes X1 and X2. For example, in the feed screw mechanism 35 on the primary pulley 3 side, when the movable member 37 is moved in a direction approaching the movable pulley 32 and presses the sheave portion 322 of the movable pulley 32 so as to narrow the groove width of the V-groove 33, in the feed screw mechanism 45 on the secondary pulley 4 side, the movable member 47 is separated from the sheave portion 422 of the movable pulley 42 and allows displacement of the movable pulley 42 in the direction separated away from the fixed pulley 41. As a result, the groove width of the V-groove 33 in the primary pulley 3 is narrowed, and the winding radius of the belt 5 is enlarged, while the groove width of the V-groove 43 in the secondary pulley 4 is widened, and the winding radius of the belt 5 is reduced, whereby shifting is performed.

(Operation at Belt Clamping)

Figure 5:
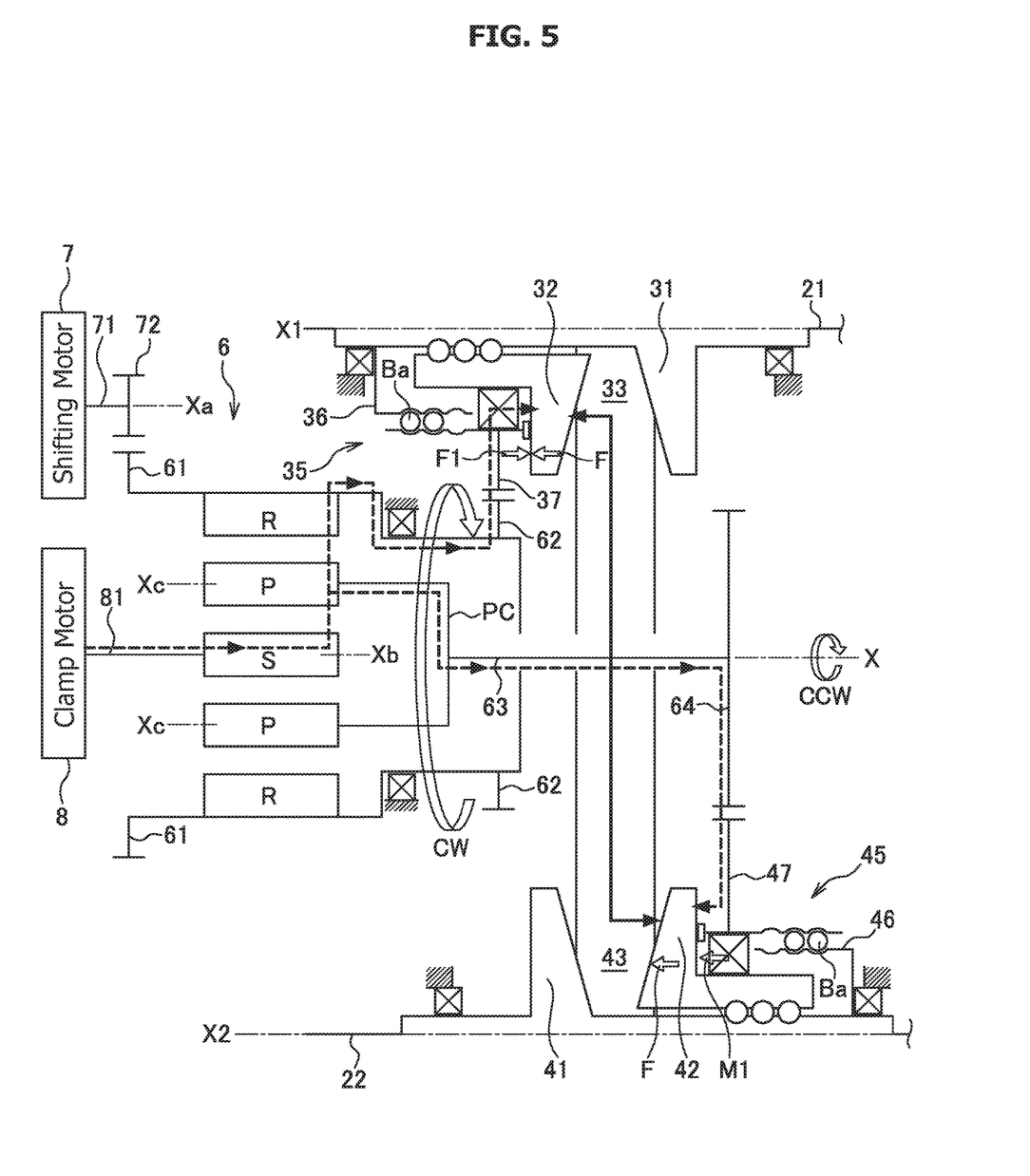
FIG. 5 is an explanatory view illustrating an operation at belt clamping of the automatic transmission of the same.

FIG. 5 illustrates an operation when the speed ratio of the automatic transmission 1 according to this embodiment is held.

When the speed ratio is to be held, the shifting motor 7 is stopped, while the pulley thrust is generated by the clamp motor 8 so as to hold the belt clamping force, and the positions of the movable pulleys 32 and 42 are fixed. In order to stabilize the operation, the shifting motor 7 may be driven at the same time so that a certain holding torque is generated by the shifting motor 7.

The output torque of the clamp motor 8 is input into the sub gear S and is input into the pinion gear P and the ring gear R through the sun gear S. The torque input into the pinion gear P is transmitted to the pinion carrier PC and moreover, is transmitted to the output gear portion 64 through the rotation transmission shaft 63. The torque input into the ring gear R is transmitted to the output gear portion 62.

Here, if a direction of the torque transmitted to the output gear portion 64 is a direction indicated by an arrow CCW, and the pulley thrust in a direction indicated by an arrow M1 acts on the movable pulley 42 in the secondary pulley 4, for example, a belt clamping force in a direction indicated by an arrow F is generated in the belt 5 in accordance with the pulley thrust, and this belt clamping force acts on the movable pulley 32 of the primary pulley 3 through the belt 5 and causes the movable pulley 32 to generate a pressing force in the direction F for widening the groove width of the V-groove 33.

On the other hand, in the primary pulley 3, the torque transmitted to the output gear portion 62 (an arrow CW) acts on the movable member 37 of the feed screw mechanism 35, and the movable member 37 is in a state pressed onto the sheave portion 322 of the movable pulley 32 by a pulley thrust F1 balanced with the pressing force F on the movable pulley 32. As described above, when the speed ratio is to be held, the positions of the movable pulleys 32 and 42 are fixed in both the primary pulley 3 and the secondary pulley 4, and the groove widths of the V-grooves 33 and 43 are not changed but held constant.

(Constitution of Pulley Propulsion Device)

Figure 6:
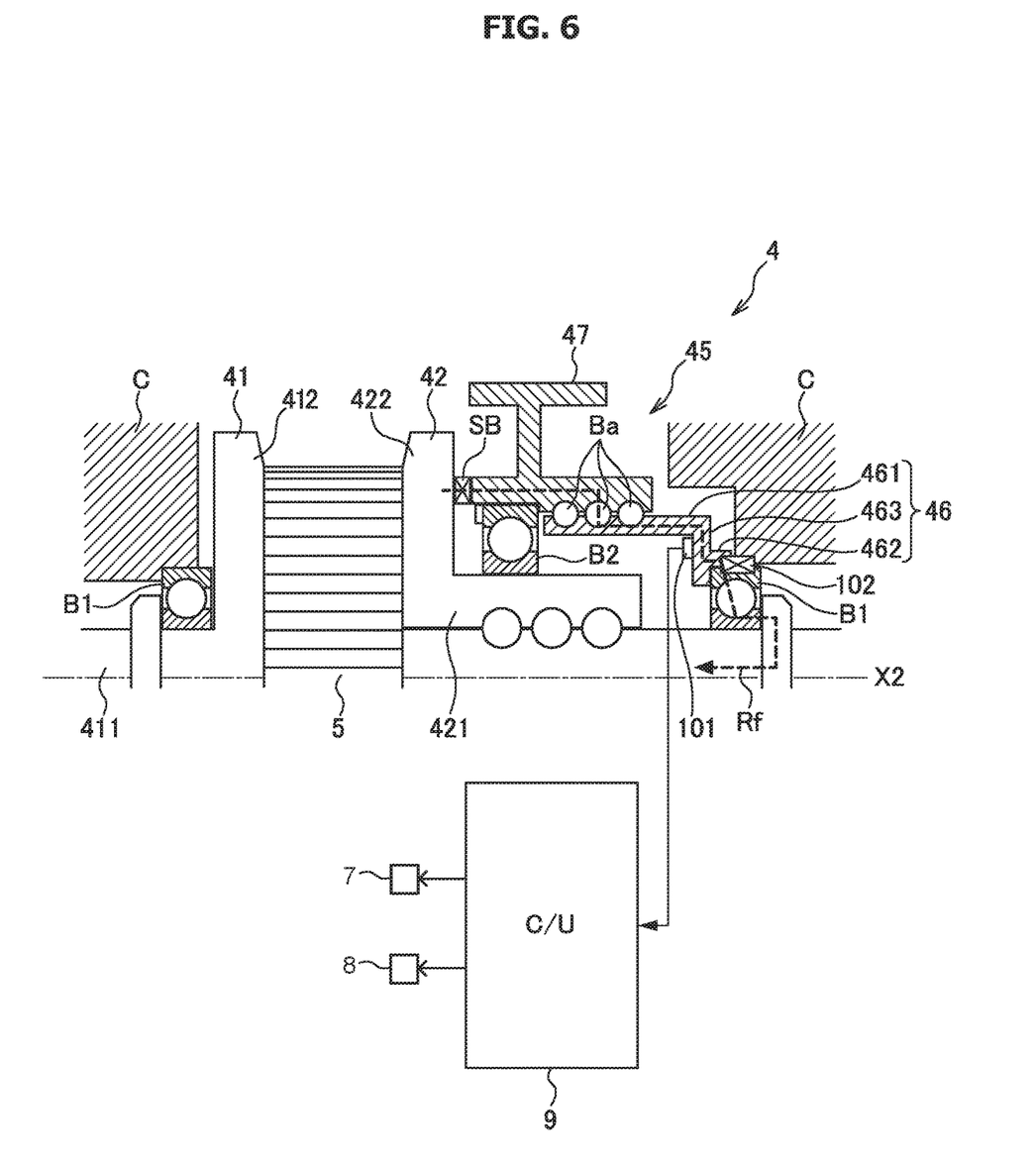
FIG. 6 is a configuration diagram of a pulley propulsion device provided in the automatic transmission of the same.

FIG. 6 schematically illustrates a constitution of the pulley propulsion device according to this embodiment.

The pulley propulsion device according to this embodiment will described by referring to FIG. 6 by being represented by the secondary pulley 4.

The pulley propulsion device is to convert the output torques of the electric motors 7 and 8 which are power sources to pulley thrust to the movable pulley 42 and is embodied by the shifting motor 7 and the clamp motor 8 constituted by electric motors, the planetary gear mechanism 6 adapted to transmit the output torques of the electric motors 7 and 8 to the feed screw mechanism 45 and moreover by the fixed member 46 and the movable member 47 of the feed screw mechanism 45 in this embodiment. The electric motors 7 and 8 and the planetary gear mechanism 6 constitute a "driving mechanism".

In addition to the above, the pulley propulsion device includes a load sensor 101 adapted to detect a pulley thrust actually applied to the movable pulley 42. The pulley thrust is input into the control device 9 as an index indicating an operation state of the automatic transmission 1 and is reflected in control of the automatic transmission 1. The control device 9 constitutes a "control unit" and is embodied by the transmission controller 9 in this embodiment.

In this embodiment, the control device 9 controls the output torques of the shifting motor 7 and the clamp motor 8 so that an operation request to the vehicle or a target speed ratio according to an actual operation state of the vehicle is achieved. On the other hand, in belt clamping, the output torque of the clamp motor 8 is controlled on the basis of the pulley thrust, and the belt clamping force is adjusted. Specifically, if the pulley thrust is smaller than a predetermined value required for a stable operation in the belt clamping, the output torque of the clamp motor 8 is increased, and the belt clamping force is increased.

The movable member 47 is constituted capable of relative rotation around the rotation axis X2 of the pulley (secondary pulley 4) with respect to the movable pulley 42, accepts a reaction force to the pulley thrust from the movable pulley 42, and transmits it to the fixed member 46.

The fixed member 46 is in a state where the rotation with respect to the pulley case C is regulated and is constituted such that the reaction force of the pulley thrust is input from the movable member 47, and this can be converted to a deformation amount or a distortion amount of the member 46.

Specifically, a rotation regulating member 102 is interposed between the fixed member 46 and the pulley case C, and the rotation of the fixed member 46 with respect to the pulley case C is regulated by the rotation regulating member 102.

Then, in the fixed member 46, a base end portion 462 engaged with the rotation regulating member 102 and a cylindrical portion 461 located closer to the movable pulley 42 than the base end portion 462 and engaged with the movable member 47 though the ball Ba of the feed screw mechanism are provided, and a radial extending portion 463 extending in a radial direction around the rotation axis X2 is formed between the base end portion 462 and the cylindrical portion 461 so that deformation of the fixed member 46 with respect to an input of the reaction force is generated in a concentrated manner in the radial extending portion 463. Thus, in this embodiment, the radial extending portion 463 constitutes a "distortion promotion region" of the fixed member 46, and the cylindrical portion 461 constitutes an "engagement portion" engaged with the movable member 47.

Moreover, in this embodiment, the fixed member 46 is brought into contact in the direction of the rotation axis X2 with the radial bearing B1, and displacement in the axial direction of the fixed member 46 is in a state regulated by this radial bearing B1. As a result, the reaction force of the pulley thrust is transmitted from the fixed member 46 to a rotation shaft 411 of the fixed pulley 41 through the radial bearing B1, and application of the reaction force to the pulley case C can be avoided. In FIG. 6, a transmission path of the reaction force to the pulley thrust is indicated by a dotted line Rf.

The load sensor 101 is embodied by a distortion sensor and is mounted on the radial extending portion 463 which is the distortion promotion region of the fixed member 46. In this embodiment, the load sensor 101 is mounted on an inner surface (a surface directed to the belt 5 side) of the fixed member 46 which is an extending side with respect to the input of the reaction force, but can be mounted on an outer surface (the surface directed to the pulley case C side) which is a compression side. Moreover, the load sensor 101 is disposed with a shift in a circumferential direction around the rotation axis X2 with respect to the rotation regulating member 102 and is disposed correspondingly to a belt wound region of the movable pulley 42.

Figure 7:
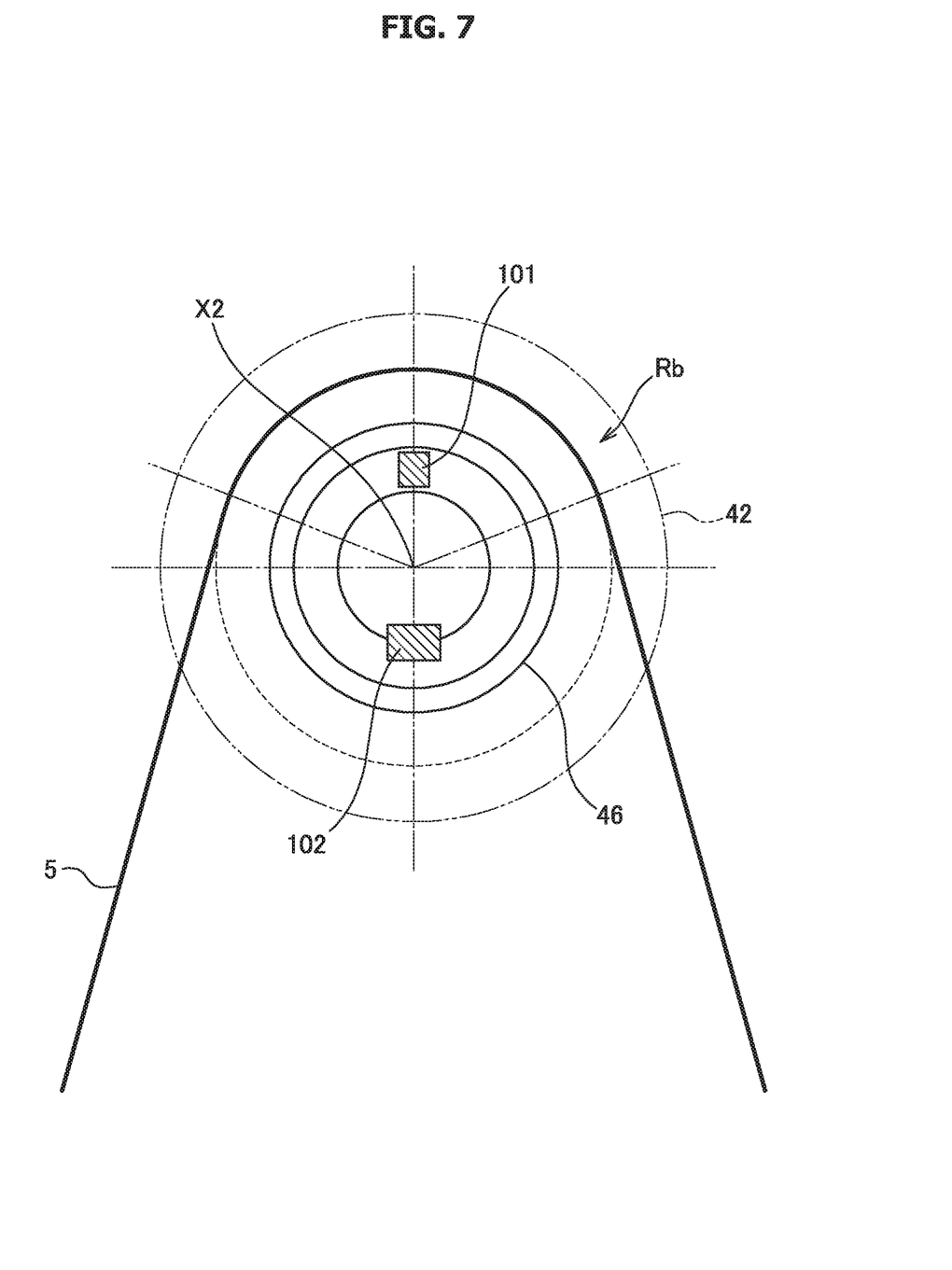
FIG. 7 is an explanatory view illustrating a belt winding region of a movable pulley.

FIG. 7 illustrates a state of the movable member 46 when seen from the fixed pulley 41 side along the rotation axis X2 of the secondary pulley 4, and an outer shape of the movable pulley 42 is indicated by a two-dot chain line. The belt wound region Rb of the movable pulley 42 is formed having an arc shape around the rotation axis X2 as a region where the sheave surface 422a of the movable pulley 42 is in contact with the belt 5. In this embodiment, the load sensor 101 is provided correspondingly to the belt wound region Rb and is disposed at the center of the belt wound region Rb between an arc portion of the belt 5 and the rotation axis X2 in the circumferential direction around the rotation axis X2. The rotation regulating member 102 is disposed on a side opposite to the load sensor 101 with the rotation axis X2 between them.

The pulley propulsion device provided on the primary pulley 3 may be also similar to that of the secondary pulley 4. Specifically, the pulley propulsion device of the primary pulley 3 is embodied by the shifting motor 7 and the clamp motor 8, the planetary gear mechanism 6 adapted to cause the output torques of these electric motors 7 and 8 to be transmitted to the feed screw mechanism 35, and the fixed member 36 and the movable member 37 of the feed screw mechanism 35 as a device adapted to covert the output torques of the electric motors 7 and 8 to the pulley thrust to the movable pulley 32.

(Description of Working Effects)

The automatic transmission 1 and the pulley propulsion device thereof according to this embodiment are constituted as above, and the effects obtained by this embodiment will be described in summary.

First, since the load sensor 101 is installed on the fixed members 36 and 46 whose rotation with respect to the pulley case C is regulated, and the actual pulley thrust is detected on the basis of a detection signal of this load sensor 101, the pulley thrust can be detected without being influenced by a rotation element such as a bearing. Thus, the pulley thrust to the movable pulleys 32 and 42 can be accurately controlled with high responsiveness. Moreover, since there is no interference from the rotation element, wiring around the load sensor 101 is made easy.

Secondly, since the load sensor 101 is disposed with a shift in the circumferential direction with respect to the rotation regulating member 102 adapted to regulate the rotation of the fixed members 36 and 46, interference of an input from the pulley case C to the detection of the pulley thrust can be suppressed.

And since the load sensor 101 and the rotation regulating member 102 are disposed on the opposite side based on the rotation axes X1 and X2 of the pulley, an influence of such disturbance can be suppressed more reliably.

Thirdly, since the load sensor 101 is disposed correspondingly to the belt wound region Rb of the movable pulleys 32 and 42, the pulley thrust can be detected more accurately by the load sensor 101 mounted on the fixed members 36 and 46.

Fourthly, since the distortion promotion region is formed on the fixed members 36 and 46, and the load sensor 101 is installed on this region, the pulley thrust can be efficiently detected.

Then, since the radial extending portion is formed on the fixed members 36 and 46, and the load sensor 101 is installed using this as the distortion promotion region, installation of the load sensor 101 is made easy.

DESCRIPTION OF OTHER EMBODIMENTS

Figure 8:
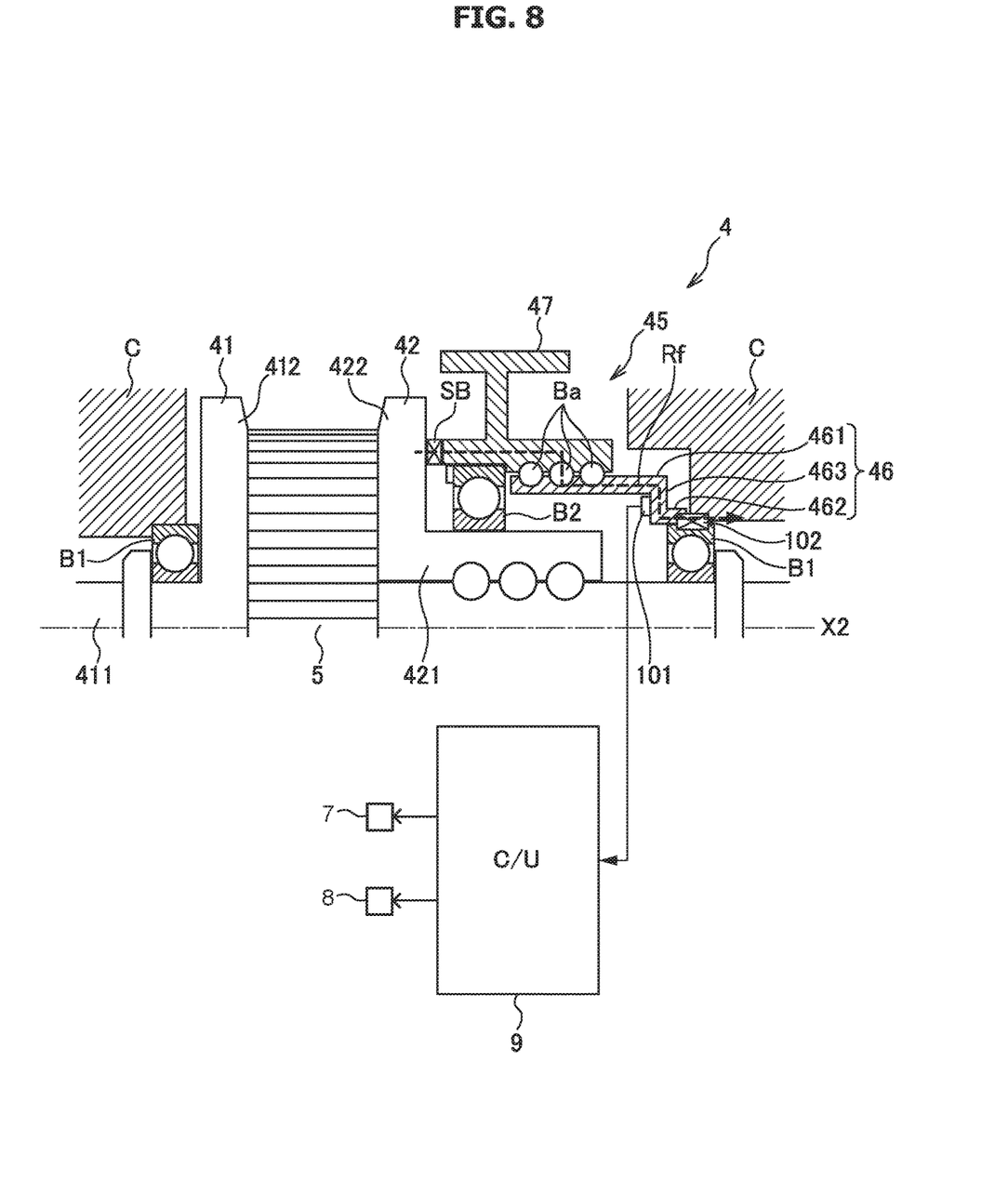
FIG. 8 is a configuration diagram of the pulley propulsion device according to another embodiment of the present invention.

FIG. 8 illustrates a constitution of a pulley propulsion device according to a second embodiment of the present invention.

Constitutions of the automatic transmission 1 including the pulley propulsion device and the power transmission system (driving system) P of the vehicle according to this embodiment and a third embodiment which will be described subsequently may be similar to those in the first embodiment.

In the first embodiment, the reaction force to the pulley thrust is transmitted from the fixed members 36 and 46 to the rotation shafts 311 and 411 of the fixed pulleys 31 and 41 through the radial bearing B1, but a transmission path Rf of the reaction force is not limited to this but the reaction force to the pulley thrust may be constituted to be transmitted from the fixed members 36 and 46 to the pulley case C.

By constituting as above, the fixed members 36 and 46 can be supported more stably than the first embodiment.

Figure 9:
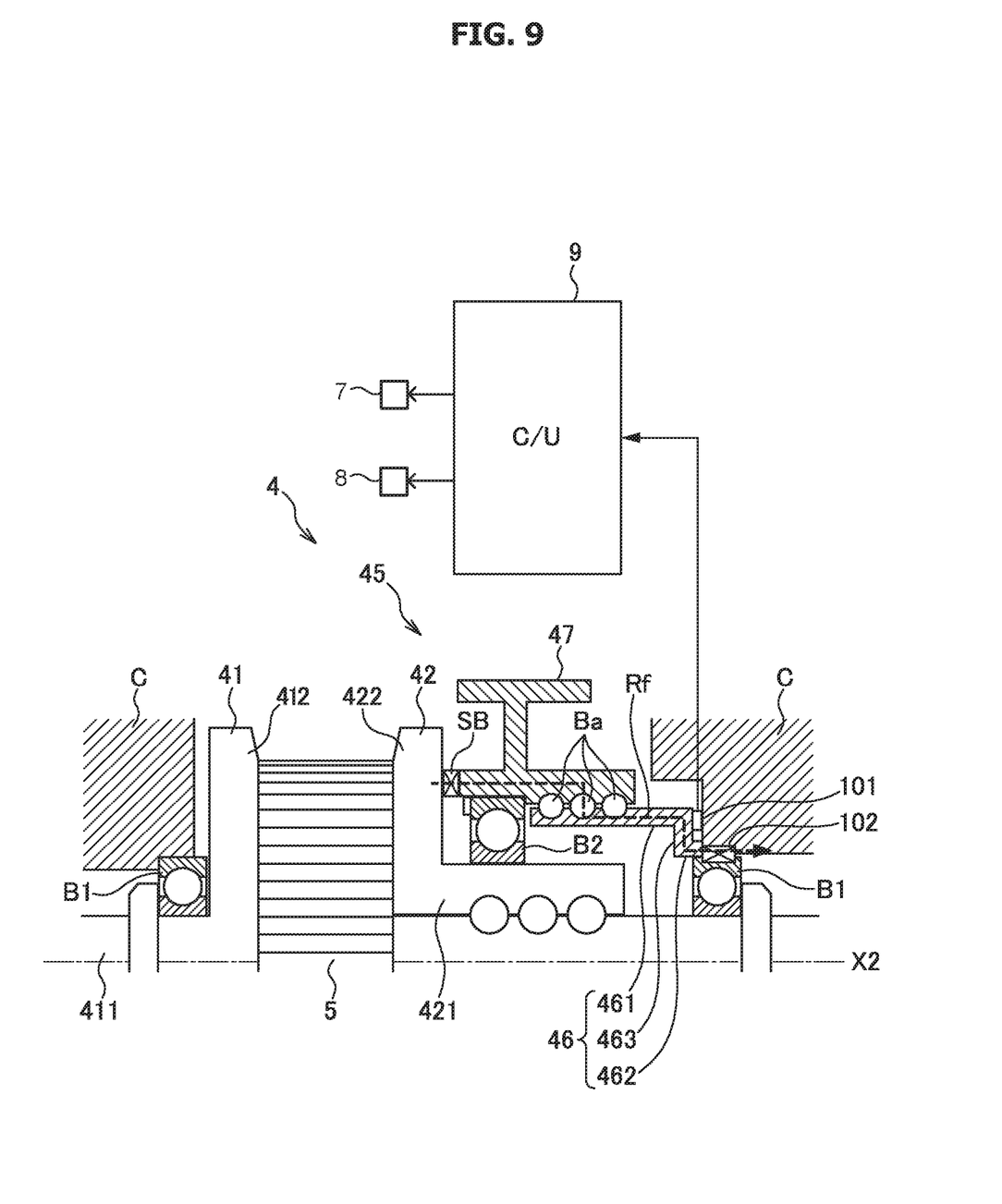
FIG. 9 is a configuration diagram of the pulley propulsion device according to still another embodiment of the present invention.

FIG. 9 illustrates a constitution of a pulley propulsion device according to the third embodiment of the present invention.

In the first embodiment, the reaction force to the pulley thrust is converted to a deformation amount or a distortion amount of the fixed members 36 and 46 and this is detected by the distortion sensor 101 so as to indirectly detect it, but the detection of the pulley thrust or its reaction force is not limited to this but may be directly performed by detecting the load applied on the fixed members 36 and 46. FIG. 9 illustrates a constitution of that case. As illustrated in the figure, the load sensor 101 is installed between the fixed members 36, 46 and the pulley case C, and the load applied on the fixed member is detected by this load sensor 101.

As a result, a function of the load sensor 101 can be realized by more various types of sensors, and a degree of freedom in design is increased.

The embodiments of the present invention have been described, but the aforementioned embodiments only illustrate a part of the application examples of the present invention and is not intended to limit the technical scope of the present invention to the specific constitutions of the aforementioned embodiments. The present invention is capable of various changes and modifications within a range of matters described in the claims.

This application claims a priority based on a Japanese patent application No. 2016-200367 filed with the Japanese Patent Office on Oct. 11, 2016, the entire contents of which application is incorporated herein by reference.

The invention claimed is:

1. A pulley propulsion device for an automatic transmission, provided in the automatic transmission including:
a fixed pulley; and
a movable pulley constituted capable of relative displacement along a rotation axis of a pulley with respect to the fixed pulley, comprising:
a movable member constituted capable of relative rotation around a rotation axis of the pulley with respect to the movable pulley;
a fixed member whose rotation with respect to a pulley case is regulated and adapted to give linear displacement to the movable member along the rotation axis of the pulley on the basis of rotation thereof;
a driving mechanism having an electric motor and adapted to cause an output torque of the electric motor to be transmitted to the movable member and to cause the movable pulley to generate a predetermined pulley thrust; and
a load sensor adapted to detect a load applied on the fixed member, the load sensor being disposed correspondingly to a belt wound region of the movable pulley in the circumferential direction around the rotation axis of the pulley.

2. The pulley propulsion device for an automatic transmission according to claim 1, wherein
the load sensor is a distortion sensor and is provided on the fixed member.

3. The pulley propulsion device for an automatic transmission according to claim 1, wherein
the fixed member has a ball screw mechanism and gives the linear displacement to the movable member through the ball screw mechanism.

4. The pulley propulsion device for an automatic transmission according to claim 1, further comprising:
a rotation regulating member adapted to regulate rotation of the fixed member with respect to the pulley case, wherein
the rotation regulating member is disposed with a shift in a circumferential direction around a rotation axis of the pulley with respect to the load sensor.

5. The pulley propulsion device for an automatic transmission according to claim 1, wherein
the fixed member has a distortion promotion region where distortion to an input of a load in parallel with the rotation axis of the pulley is promoted; and
the load sensor is mounted on the distortion promotion region.

6. The pulley propulsion device for an automatic transmission according to claim 1, wherein
the fixed member has:
an engagement portion engaged with the movable member and adapted to give linear displacement based on the rotation to the movable member; and
a radial extending portion provided on a downstream side of the engagement portion in relation with a transmission direction of a reaction force from the movable pulley to the pulley thrust and extending in a radial direction around the rotation axis of the pulley, wherein
the load sensor is mounted on the radial extending portion.

7. A control device for an automatic transmission comprising:
the pulley propulsion device according to claim 1; and
a control unit adapted to control the electric motor on the basis of a detection signal of the load sensor.

8. The control device for an automatic transmission according to claim 7, wherein
the automatic transmission is provided on a power transmission path connecting a driving source of a vehicle and a driving wheel, and includes:
a primary pulley connected to an output shaft of the driving source;
a secondary pulley connected to a rotation shaft of the driving wheel, and
a belt wound between the primary pulley and the secondary pulley, wherein
the fixed pulley is a fixed pulley of the primary pulley or the secondary pulley; and the movable pulley is a movable pulley of the primary pulley or the secondary pulley and sandwiches the belt in collaboration with the fixed pulley.

* * * * *